United States Patent [19]

Kosolapov et al.

[11] Patent Number: 4,536,041
[45] Date of Patent: Aug. 20, 1985

[54] ANTI-LOCK BRAKE SYSTEM OF A MOTOR VEHICLE

[75] Inventors: Gennady M. Kosolapov; Alexandr A. Revin; Jury Y. Komarov, all of Volgograd; Vladimir A. Umnyashkin, Izhevsk; Alexandr S. Kondrashkin, Izhevsk; Jury A. Sobolev, Izhevsk, all of U.S.S.R.

[73] Assignee: Znameni Politekhnichesky Institut, Volgograd, U.S.S.R.

[21] Appl. No.: 490,962

[22] Filed: May 2, 1983

[51] Int. Cl.³ .............................................. B60T 8/02
[52] U.S. Cl. ................................. 303/119; 188/181 A; 303/116
[58] Field of Search ............... 303/119, 116, 115, 113, 303/61–63, 68–69, 10; 188/181

[56] References Cited

U.S. PATENT DOCUMENTS

| | | | |
|---|---|---|---|
| 3,420,580 | 1/1969 | Dymond | 188/181 A X |
| 3,508,189 | 6/1971 | Cumming | 188/181 A X |
| 3,651,900 | 3/1972 | Feikema | 188/181 T |
| 3,688,859 | 9/1972 | Hudspeth et al. | 180/66 B |
| 3,731,980 | 5/1973 | Fink et al. | 303/119 |
| 3,829,166 | 8/1974 | Menar | 303/119 X |
| 4,082,369 | 4/1978 | Black et al. | 303/116 X |
| 4,099,793 | 7/1978 | Iio | 303/119 X |
| 4,354,715 | 10/1982 | Farr et al. | 303/116 |

FOREIGN PATENT DOCUMENTS

| | | | |
|---|---|---|---|
| 0004970 | 1/1977 | Japan | 303/116 |
| 1227950 | 4/1971 | United Kingdom | |
| 1493674 | 11/1977 | United Kingdom | |
| 0652000 | 3/1979 | U.S.S.R. | 303/116 |

Primary Examiner—Douglas C. Butler
Attorney, Agent, or Firm—McAulay, Fields, Fisher, Goldstein & Nissen

[57] ABSTRACT

An anti-lock brake system of a motor vehicle comprises master and wheel brake cylinders and a wheel brake release connected to a control unit and having an electromagnetic valve positioned in a hydraulic pressure line between the master brake cylinder and the wheel brake cylinder, and one or two identical wheel release cylinders; each of the chambers of the wheel release cylinders communicates with the wheel brake cylinder, pistons of the wheel release cylinders being adapted to cooperate with a cam of a cam drive connected to the transmission of the motor vehicle.

12 Claims, 7 Drawing Figures

ANTI-LOCK BRAKE SYSTEM OF A MOTOR VEHICLE

INDUSTRIAL APPLICABILITY

This invention relates generally to motor vehicles equipped with hydraulically operated brakes, and more particularly to anti-lock brake systems.

The invention can find application in automobiles, aircraft, motor cycles, and tractors provided with hydraulically operated brakes.

BACKGROUND OF THE INVENTION

There are known brake control systems (cf., e.g., U.S. Pat. No. 3,588,189; Cl.303-21) comprising a master brake cylinder, a hydraulic fluid pressure modulator with a vacuum responsive actuator, a wheel brake cylinder, a wheel rotational speed pickup transducer, a motor vehicle speed transducer, a control unit, a source of vacuum (engine), and an electromagnetic valve, wherein braking moment is controlled by energy generated by the engine of a motor vehicle.

Apart from being structurally complicated, the frequency of operating cycles in such systems is not sufficiently high.

There is also known a controllable pumping means intended to increase the volume of a hydraulic fluid in an anti-lock brake system for bringing down the braking pressure. The pumping means is driven by the engine of a motor vehicle through a cam and a follower roller, which takes off some power from the engine and extends its operating time at unstable operating conditions (cf., British Pat. No. 1,493,674; IPC B60T 8/093, published 1977).

A skid control device is further known to comprise a hydraulic fluid pressure modulator driven by a reversible electric motor thereby making it necessary to accommodate in a motor vehicle an additional drive means resulting in additional engine loading and structural complication of the system (cf. U.S. Pat. No. 3,420,580; Cl. 303-21).

Suspension of a motor vehicle may include an air compression system (cf. U.S. Pat. No. 3,688,859) in the form of a cylinder, the housing of which is affixed to the vehicle frame, while a piston rod of the cylinder is attached to a wheel suspension member of the vehicle. On the one hand, this enables to utilize vertical travel of the vehicle wheel suspension members as a source of power for air pressurization. On the other hand, such an arrangement is disadvantageous in that utilization of the energy produced by the wheel suspension members affects performance thereof and results in a less smooth travel of the motor vehicle.

There is also known a mechancial wheel anti-lock means (cf. U.S. Pat. No. 3,651,900; IPC B60T 8/16, published 1971) comprising master and wheel brake cylinders, and an additional smaller cylinder having two oppositely disposed pistons therein. Due to the fact that a brake disk is made up of two annular working parts having disposed therebetween circumferentially thereof four spokes of substantially rectangular cross-section, modulation of pressure of the hydraulic fluid in the wheel brake cylinder is effected by virtue of variations in the rigid connection between the brake disk and a hub. Such a mechanical overcomplication of the wheel anti-lock means reduces to a great extent its reliability.

An attempt has been made to utilize the energy of the transmission of a motor vehicle for driving a variable displacement pumping means (cf. U.S. Pat. No. 4,082,369; Cl. 303-3; and British Pat. No. 1,248,787; IPC B60T 8/08). However, such systems are inherently disadvantageous because the pumping means is driven by the transmission in the driving mode of operation which in the end leads to additional loading of the engine.

Finally, there is known a hydraulically operated anti-lock brake system (cf. British Pat. No. 1,227,950; IPC B60T 8/08, published 1971) which is closest to the one to be described later in this specification. It comprises a master brake cylinder connected to a wheel brake cylinder through an electromagnetic valve, two hydraulic fluid tanks, two pumping units powered by a cam drive means from a transmission, and a control unit for controlling the action of the electromagnetic valve, the control unit being connected to a wheel rotational speed transducer or sensor. An alternative embodiment of the anti-lock brake system according to the above-cited patent comprises a master brake cylinder connected to a wheel brake cylinder via an electromagnetic valve, a hydraulic fluid tank, a pumping means driven by a cam drive powered from the transmission, a control unit for controlling the function of the electromagnetic valve, the control unit being connected to a wheel rotational speed sensor. This system is likewise disadvantageous because it requires the use of a large number of parts which reduces the overall reliability thereof.

SUMMARY OF THE INVENTION

It is an object of this invention to provide an anti-lock brake system of a motor vehicle of a simplified construction.

Another object is to provide a reliable anti-lock brake system of a motor vehicle.

Another object is to provide a quick response anti-lock brake system of a motor vehicle.

Yet another object is to provide an efficient anti-lock system of a motor vehicle.

These objects are attained in a hydraulically operated anti-lock brake system of a motor vehicle in which a master brake cylinder is connected to a wheel brake cylinder through a wheel brake release means provided with an electromagnetic valve and having a cam drive means connected to a transmission and interconnected with a control unit wired to a wheel angular velocity transducer, the electromagnetic valve being interposed in a hydraulic pressure line between the master brake cylinder and the wheel brake cylinder, in which system, according to the invention, the wheel brake release means comprises one or two identical wheel release cylinders, chambers of each of these cylinders communicating via a corresponding electromagnetic valve with a chamber of the wheel brake cylinder, pistons of these cylinders being adapted to cooperate with a cam of the cam drive means.

Preferably, the wheel brake release means comprises two identical non-return valves disposed in parallel with the corresponding electromagnetic valve acting to communicate the wheel brake cylinder with the two identical cylinders of the wheel brake release means and to prevent the hydraulic fluid flowing from the hydraulic pressure line into the chambers of the wheel release cylinders.

The cam of the cam drive means may have a contour ensuring that during cooperation of the cam with the pistons of the wheel release cylinders a constant volumetric sum of the chambers of these cylinders are maintained.

Preferably, the wheel brake release means comprises two non-return valves, the first of which is disposed between the wheel release cylinder and the wheel brake cylinder to prevent the hydraulic fluid flowing from the latter into the former, while the second of the two non-return valves is positioned between the wheel release cylinder and the master brake cylinder to prevent the hydraulic fluid flowing from the former into the latter, a pressure release valve being further provided arranged in parallel with the second non-return valve to bring down pressure in the working chamber of the wheel release cylinder, a control chamber of the pressure release valve being connected to the master brake cylinder, the piston of the wheel release cylinder being spring-loaded and adapted to have a gap relative to the cam of the cam drive means.

The provision in the anti-lock brake system of the wheel brake release means enables to make use of kinetic energy of the moving motor vehicle during a braking action to restore pressure of the hydraulic fluid subsequent to a wheel anti-locking action, this energy being taken off at the initial stage of braking when the value of this energy is the highest and the adhesive force between the wheel and the road surface is at its maximum. The provision of the wheel brake release means is further advantageous in that it allows to dispense with the use of the engine power for its operation thereby improving the fuel efficiency of the engine, which is especially important at present.

The arrangement of the wheel brake release means in the form of two oppositely disposed wheel release cylinders driven from the transmission of the motor vehicle makes it possible to substantially simplify the construction and improve the reliability of the anti-lock brake system, the execution frequency thereof being determined by the control unit, which leads to enhanced efficiency of braking.

A modified form of the anti-lock brake system according to the invention wherein the wheel brake release means is provided with an additional cylinder the piston of which cooperates with a cam mechanically linked with the wheel through the motor vehicle transmission also features a simple construction, improved reliability and efficiency of braking action.

The connection of the additional cylinder with the master brake cylinder through a non-return valve having arranged in parallel therewith a hydraulic cut-off valve, as well as the provision of a gap in the cam pair also act to increase the reliability and service life of the herein proposed anti-lock brake system.

BRIEF DESCRIPTION OF THE DRAWINGS

The objects and advantages of the present invention will become more fully apparent when a detailed description that follows is read with reference to the accompanying drawings, in which.

DETAILED DESCRIPTION OF THE INVENTION

Figure 1:
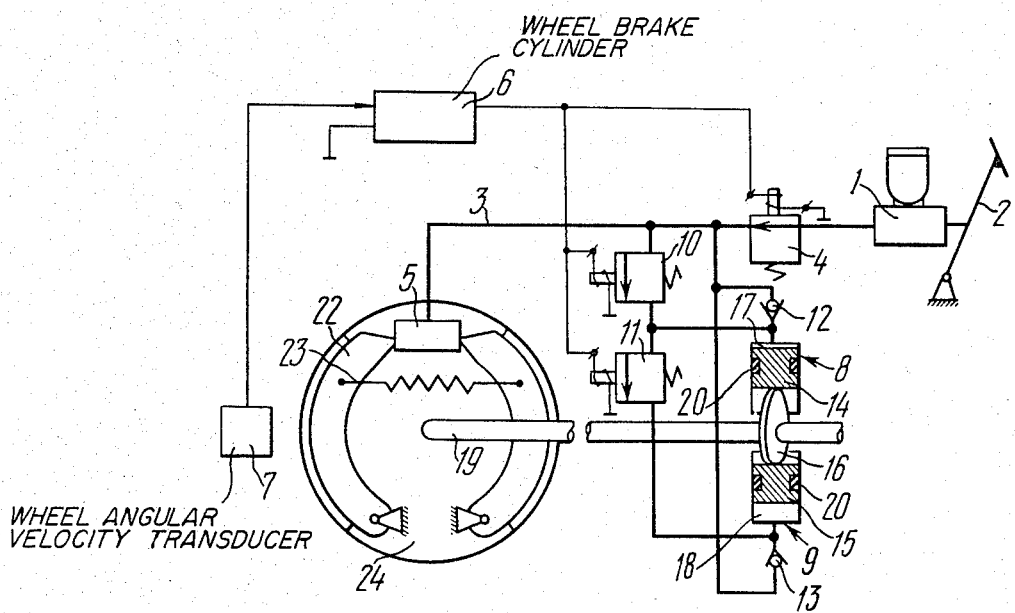
FIG. 1 is a schematic illustration of an anti-lock brake system of a motor vehicle according to the invention.

An anti-lock brake system of a motor vehicle embodying the present invention can find application in motor vehicle equipped with hydraulic brakes. With reference to FIG. 1, the system comprises a master cylinder 1 operated by a foot pedal 2, the master cylinder communicating by way of a hydraulic pressure line 3 via an electromagnetic valve 4 with a wheel brake cylinder 5, and a control unit 6 an input of which is connected to a wheel angular velocity transducer 7, while an output thereof is wired to the winding of the electromagnetic valve 4. The system further comprises a wheel brake release means made up of a pair of identical wheel release cylinders 8 and 9, two electromagnetic valves 10, 11, and two non-return valves 12, 13.

The cylinders 8, 9 are attached to a drive line half-axle shaft tube (not shown), their pistons 14, 15 being adapted to cooperate with a cam 16 of a cam drive means interconnected with a wheel (not shown). Each of chambers 17 and 18 of the cylinders 8 and 9, respectively, communicates with the wheel brake cylinder 5 via the electromagnetic valves 10, 11.

The cam 16 is secured to a half-axle 19; the cam's contour being selected such that the volumetric sum of the two chambers 17 and 18 of the cylinders 8 and 9, respectively, would always remain constant.

Figure 2:
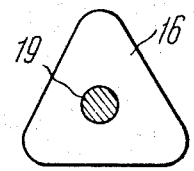
FIG. 2 is an exemplary contour of a cam.

FIG. 2 illustrates a preferred embodiment of the cam 16 shaped as a substantially equilateral triangle with arcuate corners. The cam 16 may be otherwise contoured, which is calculated according to the specifics of application in various types of motor vehicles.

For sealing purposes the pistons 14 and 15 (FIG. 1) of the cylinders 8 and 9 are provided with rubber O-rings 20 secured in grooves of the pistons 14 and 15. The shape of the grooves provides for a certain amount of deformation of the O-rings 20 during reciprocation of the pistons 14, 15, which in the absence of pressure in the cylinders 8, 9 facilitates the return of the pistons 14, 15 into their initial position due to the resiliency of the O-rings 20. The pistons 14, 15 of the cylinders 8, 9 are further urged by a spring 21 (FIG. 3a) to the upmost positions to form a gap δ relative to the surface of the cam 16.

The valves 10, 11 (FIG. 1) are connected to the output of the control unit 6. When the electromagnetic valves 10, 11 are energized, the chambers 17, 18 of the cylinders 8, 9 intercommunicate; whereas deenergization of the valves 10, 11 results in that the chambers 17, 18 of the cylinders 8, 9 tend to communicate with the wheel brake cylinder 5 via the non-return valves 12, 13. The non-return valves 12, 13 are arranged in parallel with the corresponding electromagnetic valves 10, 11.

The wheel brake cylinder 5 cooperates with brake shoes 22 mounted on a brake drum plate 24 and provided with a brake shoe return spring 23.

Figure 4:
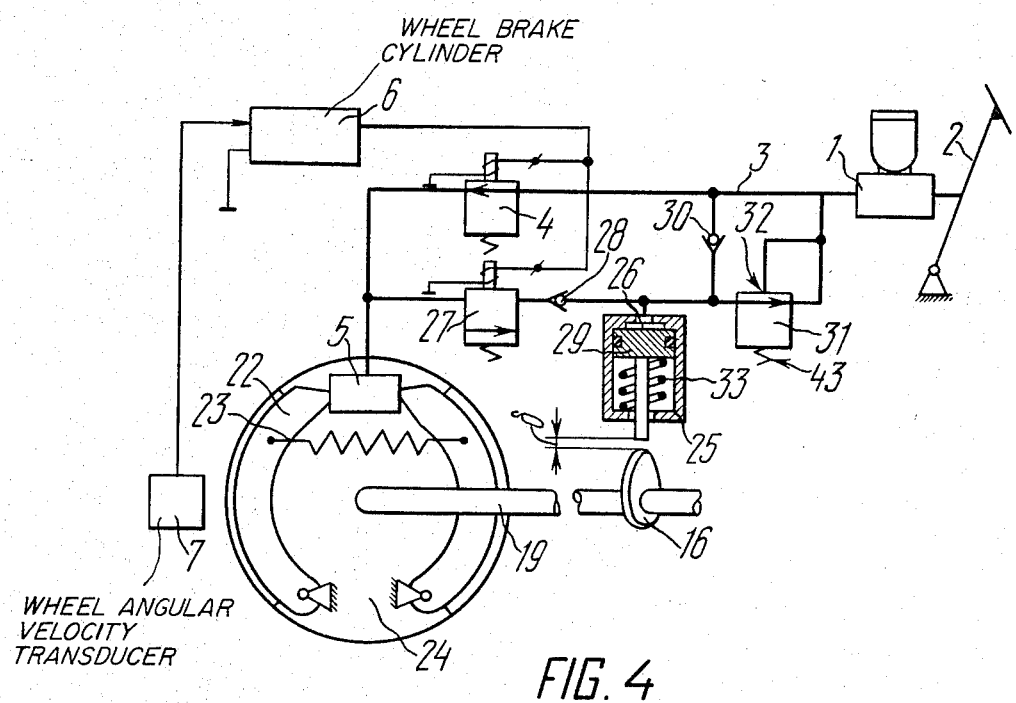
FIG. 4 is a schematic illustration of another preferred embodiment of the anti-lock brake system according to the invention.

With reference to FIG. 4, a modified form of the anti-lock brake system, as distinct from the heretofore disclosed embodiment, comprises a brake release system provided with only one wheel release cylinder 25. A cavity 26 of the cylinder 25 communicates with the wheel brake cylinder 5 through series connected electromagnetic valve 27 and non-return valve 28. A piston 29 of the wheel release cylinder 25 cooperates with the cam 16 of the cam drive means.

This second modification of the anti-lock brake system according to the invention further comprises a non-return valve 30 positioned between the wheel release cylinder 25 and the master cylinder 1, and a pressure release valve 31 disposed in parallel with the non-return valve 30, a pressure control chamber 32 of the pressure release valve 31 being connected to the master brake cylinder 1.

The piston 29 is urged to its upmost position by a spring 33 to form a gap δ relative to the surface of the cam 16.

The wheel angular velocity transducer 7 employed in the anti-lock brake system is generally an electromagnetic transducer; a speed indicating generator of any known suitable design may perform the function of such a transducer.

Figure 5:
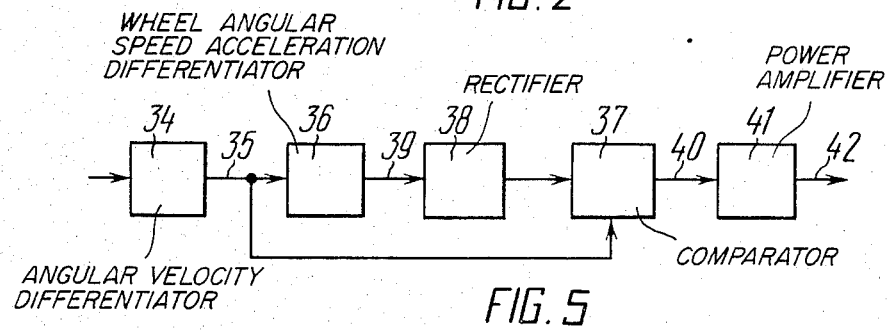
FIG. 5 is a block diagram of a control unit of the anti-lock brake system according to the invention.

Referring now to FIG. 5, there is shown an exemplary embodiment of the control unit 6 of the anti-lock brake system according to the invention. The control unit 6 comprises a wheel angular velocity differentiator 34 an output 35 of which is wired to a wheel angular speed acceleration differentiator 36 and a comparator 37 a second input of which is connected through a rectifier 38 with an output 39 of the differentiator 36, whereas an output 40 of the comparator 37 is connected to a power amplifier 41, an output 42 of the latter being the output of the control unit 6 connected to electromagnetic valves 4, 10, 11 (FIG. 1) or 4, 27 (FIG. 4) of the wheel brake release means.

The differentiator 34 (FIG. 5) is adapted to receive a signal from the output of the transducer 7 (FIGS. 1, 4).

The anti-lock brake system according to the invention operates in the following manner.

In the absence of pressure in the wheel brake chambers 17, 18 (FIG. 1) of the cylinders 8, 9 the gap δ (FIG. 3a) is formed between the piston 14 (15) and the cam 16 providing the wheel is not locked.

When the foot pedal 2 is depressed, the hydraulic fluid of the system is caused to flow under pressure from the master cylinder 1 via the valve 4 into the wheel brake cylinder 5. Concurrently, the non-return valves 12, 13 act to prevent the flow of fluid from being conveyed into the chambers 17, 18 of the cylinders 8, 9. Therewith, the brake shoes 22 under the action of the fluid tend to slow down the rotation of the wheel, whereas the transducer 7 generates and sends a signal to the control unit 6, the signal being proportional to the angular velocity of the wheel.

Figures 3A, 3B, 3C:
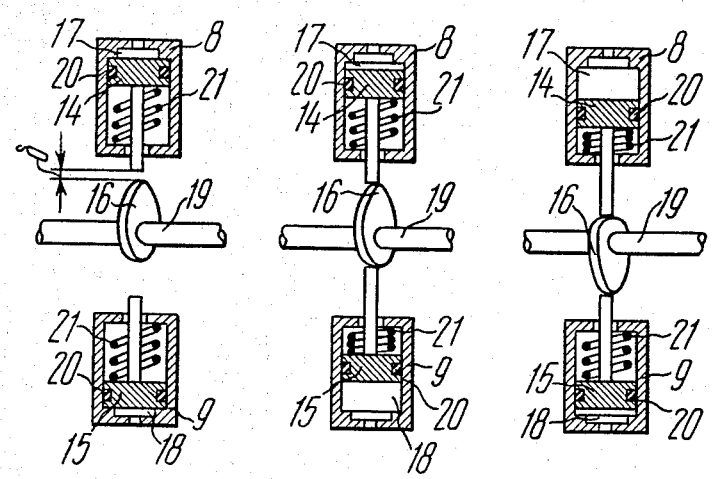
FIGS. 3a, 3b and 3c each respectively illustrate a different working phase of wheel release cylinders of the anti-lock brake system according to the invention.

The differentiators 34, 36 act to differentiate the signal corresponding to the angular velocity of the wheel. After the signal which is proportional to a second-order derivative of the angular velocity of the wheel has been rectified in the rectifier 38, the comparator 37 compares the sign of the first- and second-order derivatives of the wheel angular velocity. On the point of wheel locking these signs coincide whereby a control signal is produced at the output 42 of the control unit 6 to enter and actuate the electromagnetic valves 4, 10, 11. Therewith, the master brake cylinder 1 is caused to be cut off from the wheel brake cylinder 5 and the chambers 17, 18 of the cylinders 8, 9 are caused to simultaneously communicate with the cylinder 5. The pressurized hydraulic fluid is forced from the cylinder 5 into the free chamber 18 of one of the cylinders 9 (FIG. 3). When the cam 16 runs against the piston 15 of this cylinder 9, the hydraulic fluid is displaced from the cylinder 9 into the other cylinder 8 (FIG. 3c). In consequence, because the volumetric sum of the working chambers 17, 18 of the cylinders 8, 9 is maintained constant due to the preselected contour of the cam 16, the volume of the interior of the wheel brake cylinder 5 will increase by the value of the above volumetric sum, providing the control signal is received from the control unit 6. In this case, pressure in the wheel brake cylinder 5 tends to drop whereby the brake shoes 22 depart from the surface of a drum (not shown) under the action of the brake shoe return spring 23. Therefore, the braking moment is reduced and the braking action exerted on the wheel is released.

A successive running of the cam 16 against the pistons 14, 15 of the cylinders 8, 9 results in an alternate pumping of the hydraulic fluid from one cylinder 8 (9) into another 9 (8).

When the impending wheel lock condition is eliminated, the control unit 6 acts to terminate the control signal received by the electromagnetic valves 4, 10, 11. In this case the hydraulic fluid is alternately forced from the chambers 17, 18 of the cylinders 8, 9 via the non-return valves 12, 13 into the wheel brake cylinder 5 and the master cylinder 1 connected by the valve 4 resulting in a successive wheel braking action.

During recommencement of an impending wheel lock condition the above cycle is repeated.

The modified form of the anti-lock brake system according to the invention with reference to FIG. 4 operates as follows.

Depression of the foot brake pedal 2 causes the hydraulic fluid to pass under pressure through the electromagnetic valve 4 to the wheel brake cylinder 5. Simultaneously, the non-return valve 30 acts to prevent the flow of hydraulic fluid from penetrating the chamber 26 of the cylinder 25.

Therewith, the brake shoes 22 acted upon by the pressure of the hydraulic fluid are urged against a brake drum (not shown) resulting in a braking action exerted on the wheel. Concurrently, the pressurized hydraulic fluid enters the control chamber 32 of the valve 31, whereby the valve 31 overcomes compression of the spring 43 and cuts off the chamber 26 of the cylinder 25 from the master cylinder 1.

An impending wheel skid condition is sensed by the transducer 7 and the control unit 6 produces a signal which actuates the electromagnetic valves 4 and 27 to cut off the hydraulic pressure line 3 of the master brake cylinder 1 from the wheel brake cylinder 5, whereas the cylinder 5 is caused to be communicated with the chamber 26 of the cylinder 25 through the electromagnetic valve 27 and the non-return valve 28, whereby the piston 29 moves downwards to overcome compression force of the spring 33. An increase in the closed volume of the cut-off section "wheel brake cylinder 5—cylinder 25" leads to a drop in the pressure of the hydraulic fluid. The return spring 23 acts to move the brake shoes 22 away from the surface of the brake drum to result in a reduced braking moment, and the braking action exerted on the wheel connected mechanically through the half-axle 19 with the cam 16 is relieved. The cam 16, while rotating together with the wheel, returns the piston 29 to the upmost position, whereas the hydraulic fluid is conveyed from the chamber 26 of the cylinder 25 through the non-return valve 30 into the master brake cylinder 1, the non-return valve 28 preventing the flow of the hydraulic fluid from the chamber 26 of the cylinder 25 into the wheel brake cylinder 5.

The elimination of an impending wheel lock condition causes the electromagnetic valves 4 and 27 to be actuated which facilitates the resumption of communication between the wheel brake cylinder 5 and the master cylinder 1.

When the foot pedal is released, the pressure of the hydraulic fluid is caused to drop down. The spring 43 makes the valve 31 to return into the initial position thereby communicating the chamber 26 of the cylinder 25 with the master brake cylinder 1. The compression force of the spring 33 is chosen such as to overcome the residual pressure of the hydraulic fluid in the hydraulic fluid lines and return the piston 29 to the upmost position to ensure the gap δ in the cooperating pair "piston 29—cam 16" preventing them from coming into contact during wheel braking without impending wheel skid conditions. This allows to extend the service life of the anti-lock brake system according to the invention.

The provision of the valve 31 permits the range of possible performance characteristics of the non-return valve 30 to be extended and reduces the requirements imposed by the direct hydraulic resistance thereof.

In case of failure of the control unit 6, wheel angular velocity transducer 7, electromagnetic valves 4, 27 or the wheel brake release means, the anti-lock brake system functions as a conventional closed hydraulic brake system. This adds an important safety feature to a motor vehicle using such a system.

By virtue of the provision of the wheel brake release means the herein proposed anti-lock brake system of a motor vehicle makes it possible to use the kinetic energy of the moving vehicle during braking action for resuming the pressure of the hydraulic fluid in the brake system subsequent to a wheel release. The kinetic energy of the wheel is made use of at the initial stage of braking when the value of this energy is the highest. This enables to dispense with connecting the system to the power plant of the vehicle or using an additional power source. In view of the foregoing, the invention provides an anti-lock brake system which is simple in construction, reliable in operation and inexpensive in manufacture.

In addition, the proposed anti-lock brake system enables to improve the fuel efficiency of the engine of a motor vehicle due to that it is not required to use the engine power for its operation, and to reduce the toxicity of exhaust fumes and therefore lessen pollution of the environment through bringing down the time of engine operation at unstable operating conditions.

An important aspect of the present invention resides in the invariability of the volumetric sum of the working chambers of the wheel brake release means which makes the operating frequency of the system conform to the execution algorithm of the control unit thereby enhancing the efficiency of braking.

What is claimed is:

1. An anti-lock brake system of a motor vehicle provided with a power drive line, hydraulically operated brakes and a hydraulic drive therefor, comprising:
   a master brake cylinder intended to produce pressure in said hydraulic drive of said brakes to provide a braking action in the motor vehicle;
   a wheel brake cylinder intended to convert the pressure produced in said hydraulic drive of said brakes into a mechanical braking force;
   a hydraulic pressure line connecting said wheel brake cylinder with said master brake cylinder;
   a wheel angular velocity transducer to generate a signal corresponding to the actual angular velocity of the wheel;
   a control unit wired to said wheel angular velocity transducer and intended to generate a control signal on the point of wheel locking;
   a wheel brake release means connected to said control unit and intended to modulate pressure in said wheel brake cylinder to prevent a wheel lock condition; said means comprising:
   a first electromagnetic valve disposed in said hydraulic pressure line between said master brake cylinder and said wheel brake cylinder; said first electromagnetic valve being intended to limit pressure in said wheel brake cylinder when the wheel is on the point of locking;
   a cam drive having an initial value connected to said power drive line and having a cam; and
   first and second identical wheel release cylinders, each having a variable volume chamber communicating with said wheel brake cylinder, and a piston for each said wheel release cylinders adapted to cooperate therewith and with said cam of said cam drive to vary the volume of said chambers; said first and second wheel release cylinders each serving to reduce pressure in said wheel brake cylinder independently to ensure a wheel anti-locking action; pressure in said wheel brake cylinder being restored to the initial value by means of said cam drive subsequent to the wheel release action.

2. An anti-lock brake system as defined in claim 1 wherein said cam of said cam drive has a contour ensuring that during cooperation of said cam with said pistons of said first and second wheel release cylinders a constant volumetric sum of said chambers of said first and second wheel release cylinders is maintained.

3. The system as defined in claim 2, wherein each said piston is spring loaded and adapted to have a gap relative to said cam.

4. The system as defined in claim 3, wherein said wheel brake release means comprises:
   first and second identical non-return valves acting to prevent the hydraulic fluid flowing from said hydraulic pressure line into said chambers of said first and second wheel release cylinders;
   a second electromagnetic valve disposed in parallel said first non-return valve and adapted to communicate with said wheel brake cylinder with said first wheel release cylinder; and
   a third electromagnetic valve disposed in parallel with said second non-return valve and adapted to communicate said wheel brake cylinder with said second wheel release cylinder.

5. An anti-lock brake system as define in claim 1 wherein each said piston of said first and second wheel release cylinders is spring-loaded and adapted to have a gap relative to said cam of said cam drive.

6. An anti-lock brake system of a motor vehicle provided with a power drive line, hydraulically operated brakes and a hydraulic drive therefor, comprising:
   a master brake cylinder intended to produce pressure in said hydraulic drive of said brakes to provide a braking action in the motor vehicle;
   a wheel brake cylinder intended to convert the pressure produced in said hydraulic drive of said brakes into a mechanical braking force;
   a hydraulic pressure line connecting said wheel brake cylinder with said master brake cylinder;
   a wheel angular velocity transducer to generate a signal corresponding to the actual angular velocity of the wheel;

a control unit wired to said wheel angular velocity transducer and intended to generate a control signal on the point of wheel locking;

a wheel brake release means connected to said control unit and intended to modulate pressure in said wheel brake cylinder to prevent a wheel lock condition; said means comprising;

a first electromagnetic valve disposed in said hydraulic pressure line between said master brake cylinder and said wheel brake cylinder; said first electromagnetic valve being intended to limit pressure in said wheel brake cylinder when the wheel is on the point of locking;

a cam drive having an initial value connected to said power drive line of the motor vehicle and having a cam;

a wheel release cylinder having a chamber and a spring-loaded piston accommodated in said chamber including a spring urging said piston to its upmost position in said chamber; said wheel release cylinder serving to reduce pressure in said wheel brake cylinder to ensure a wheel anti-locking action;

a non-return valve communicating with said chamber of said wheel release cylinder;

a second electromagnetic valve connected in series to said non-return valve and adapted to communicate with said wheel brake cylinder;

said piston of said wheel release cylinder cooperating with said cam of said cam drive but being spaced from said cam to provide a gap between said piston and said cam in response to said spring urging said piston to said upmost position; pressure in said wheel brake cylinder and in said master brake cylinder being restored to said initial value by means of said cam drive.

7. An anti-lock brake system as defined in claim 6 wherein said wheel brake release means comprises a second non-return valve positioned between said wheel release cylinder and said master brake cylinder and preventing the hydraulic fluid flowing from said master brake cylinder into said wheel release cylinder.

8. An anti-lock brake system as defined in claim 7 wherein said wheel brake release means comprises a pressure release valve to bring down the pressure of the hydraulic fluid in said chamber of said wheel release cylinder, said pressure release valve being disposed in parallel with said second non-return valve; said pressure release valve having a control chamber connected to said master brake cylinder.

9. An anti-lock brake system as defined in claim 6, wherein said wheel brake release means comprises a pressure release valve to bring down the pressure of the hydraulic fluid in said chamber of said wheel release cylinder, said pressure release valve being disposed in parallel with a second non-return valve; said pressure release valve having a control chamber connected to said master brake cylinder.

10. An anti-lock brake system of a motor vehicle provided with a power drive line, hydraulically operated brakes and a hydraulic drive therefor, comprising:

a master brake cylinder for producing pressure in said hydraulic drive to provide a braking action in the motor vehicle;

a wheel brake cylinder for converting the pressure produced in said hydraulic drive into a mechanical braking force;

a hydraulic pressure line connecting said wheel brake cylinder with said master brake cylinder;

a wheel angular velocity transducer for generating a signal corresponding to the actual angular velocity of the wheel;

a control unit wired to said wheel angular velocity transducer for generating a control signal on the point of wheel locking;

wheel brake release means connected to said control unit for modulating pressure in said wheel brake cylinder to prevent a wheel lock condition, said means comprising:

a first electromagnetic valve disposed in said hydraulic pressure line between said master brake cylinder and said wheel brake cylinder for limiting pressure in said wheel brake cylinder when the wheel is on the point of locking;

a cam drive having an initial value connected to said power drive line and having a cam;

first and second identical wheel release cylinders, each having a chamber communicating with said wheel brake cylinder, and each wheel release cylinders having a piston adapted to cooperate with said cam for reducing pressure in said wheel brake cylinder to ensure a wheel anti-locking action, pressure in said wheel brake cylinder being restored to the initial value by means of said cam drive subsequent to the wheel release action;

first and second identical non-return valves for preventing the hydraulic fluid flowing from said hydraulic pressure line into said chambers of said first and second wheel release cylinders;

a second electromagnetic valve disposed in parallel with said first non-return valve for communicating said wheel brake cylinder with said first wheel release cylinder; and a third electromagnetic valve disposed in parallel with said second non-return valve for communicating said wheel brake cylinder with said second wheel release cylinder.

11. The system as defined in claim 10, wherein said cam has a contour ensuring that during cooperation of said cam with said pistons a constant volumetric sum of said chambers of said first and second wheel release cylinders is maintained.

12. The system as defined in claim 10, wherein each said piston is spring-loaded and has a gap relative to said cam.

* * * * *

UNITED STATES PATENT AND TRADEMARK OFFICE
CERTIFICATE OF CORRECTION

PATENT NO. : 4,536,041
DATED : August 20, 1985
INVENTOR(S) : Gennedy M. Kosolapov, et al.

It is certified that error appears in the above—identified patent and that said Letters Patent is hereby corrected as shown below:

Column 8, line 51, "define" should be --defined--.

Signed and Sealed this

Twenty-second Day of April 1986

[SEAL]

Attest:

DONALD J. QUIGG

Attesting Officer

Commissioner of Patents and Trademarks